(12) United States Patent
Gouboth et al.

(10) Patent No.: US 10,192,462 B1
(45) Date of Patent: Jan. 29, 2019

(54) BATHING TRAINER

(71) Applicant: Djimir Gouboth, New City, NY (US)

(72) Inventors: Djimir Gouboth, New City, NY (US); Nisha Sawhney, New York, NY (US)

(73) Assignee: Djimir Gouboth, New City, NY (US)

( * ) Notice: Subject to any disclaimer, the term of this patent is extended or adjusted under 35 U.S.C. 154(b) by 0 days.

(21) Appl. No.: 15/689,020

(22) Filed: Aug. 29, 2017

(51) Int. Cl.
*A47K 3/164* (2006.01)
*G09B 19/00* (2006.01)
*A47K 3/064* (2006.01)
*A47K 3/00* (2006.01)

(52) U.S. Cl.
CPC .......... *G09B 19/0076* (2013.01); *A47K 3/001* (2013.01); *A47K 3/064* (2013.01)

(58) Field of Classification Search
CPC ..... G09B 19/0076; A47K 3/001; A47K 3/064
USPC ........................................................... 4/587
See application file for complete search history.

(56) References Cited

U.S. PATENT DOCUMENTS

| | | | |
|---|---|---|---|
| 30,465 A | 10/1860 | Curtiss | |
| 46,168 A | 1/1865 | Wilcox | |
| 248,783 A | 10/1881 | Oblinger | |
| 459,388 A | 9/1891 | Barrett | |
| 664,147 A | 12/1900 | Harth | |
| 702,650 A | 6/1902 | Hazen | |
| 724,255 A | 3/1903 | Brown | |
| 801,233 A | 10/1905 | Frank | |
| 921,516 A | 5/1909 | Dawson | |
| 933,216 A | 9/1909 | Wilson | |
| 938,431 A | 10/1909 | Orcutt | |
| 1,039,044 A | 9/1912 | Fuhrman | |
| 1,041,758 A | 10/1912 | Ellis | |
| 1,047,449 A * | 12/1912 | Russ | A47K 3/064 4/587 |
| 1,048,411 A | 12/1912 | Hutchins | |
| 1,054,561 A | 2/1913 | Kennedy | |
| 1,095,631 A | 5/1914 | Heilbron | |
| 1,122,581 A | 12/1914 | Flitcraft | |
| 1,152,846 A | 9/1915 | Ross | |
| 1,167,497 A | 1/1916 | Hayes | |
| 1,202,085 A | 10/1916 | Mitchell | |
| 1,202,761 A | 10/1916 | Crabtree | |
| 1,208,445 A | 12/1916 | Arnold | |
| 1,225,511 A | 5/1917 | Sexton | |
| 1,233,117 A | 7/1917 | Parker | |
| 1,243,381 A | 10/1917 | Bokop | |
| 1,260,779 A | 3/1918 | Koos | |
| 1,289,410 A | 12/1918 | Day | |

(Continued)

*Primary Examiner* — Huyen Le
(74) *Attorney, Agent, or Firm* — Gottlieb, Rackman & Reisman, P.C.

(57) ABSTRACT

A bath trainer is provided defined by a bucket having sides forming an interior water-tight space for holding water, said sides being configured to fold to a closed position when the bucket is not in use and unfold to an open position for receiving water; and a mat configured to be removably attached to said bucket. While the bucket is closed, other elements may be stored therein, such as a mug for pouring water and rising, a stool, bathing toys, etc. At least some portion of the bucket is made of a thermochromatic material that changes color with temperature so that a user can determine whether the water within the bucket is at an appropriate temperature for a child to take a bath.

18 Claims, 7 Drawing Sheets

(56) References Cited

U.S. PATENT DOCUMENTS

| | | | |
|---|---|---|---|
| 1,334,260 A * | 3/1920 | Quick | A47K 1/12 312/351.6 |
| 1,385,934 A | 7/1921 | Viner | |
| 1,436,499 A | 11/1922 | Hammond | |
| 1,439,180 A | 12/1922 | MacGovern | |
| 1,454,388 A | 5/1923 | Lauren | |
| 1,464,548 A | 8/1923 | Stephens | |
| 1,487,988 A | 3/1924 | Tesche | |
| 1,489,394 A | 4/1924 | Moore | |
| 1,491,853 A | 4/1924 | Foust | |
| 1,517,074 A | 11/1924 | Kirkpatrick | |
| 1,576,147 A | 3/1926 | Shell | |
| 1,607,095 A | 11/1926 | Miller | |
| 1,680,191 A | 8/1928 | Woolf | |
| 1,693,389 A * | 11/1928 | Kennedy | A47K 3/164 4/546 |
| 1,724,743 A | 8/1929 | Allen | |
| 1,843,164 A | 2/1932 | Johnson | |
| 1,867,673 A * | 7/1932 | McCandless | A47K 3/164 4/551 |
| 2,051,940 A | 8/1936 | Chichester-Miles | |
| 2,438,434 A | 3/1948 | Friedman | |
| 2,524,497 A | 10/1950 | Tozzi | |
| 2,580,879 A | 1/1952 | Belokin | |
| 2,638,952 A | 5/1953 | Sanderson | |
| 2,664,131 A | 12/1953 | Miller | |
| 2,739,410 A | 3/1956 | Budnick | |
| 2,780,378 A | 2/1957 | Romano | |
| 2,837,860 A | 6/1958 | Norling | |
| 2,865,421 A | 12/1958 | Walsh | |
| 2,886,084 A | 5/1959 | Davison | |
| 2,893,167 A | 7/1959 | Davidson | |
| 2,912,785 A | 11/1959 | Nudell | |
| 3,014,516 A | 12/1961 | Mueller | |
| 3,058,507 A | 10/1962 | Patterson | |
| 3,173,573 A | 3/1965 | Donegan | |
| 3,220,544 A | 11/1965 | Lovell | |
| 3,301,293 A | 1/1967 | Santelli | |
| 3,434,589 A | 3/1969 | Valtri | |
| 3,474,844 A | 10/1969 | Lindstrom | |
| 3,587,937 A | 6/1971 | Childs | |
| 3,799,228 A * | 3/1974 | Crawford | A45F 4/00 220/9.2 |
| 3,833,154 A | 9/1974 | Markowitz | |
| 3,939,887 A | 2/1976 | Scarnato | |
| 3,939,888 A | 2/1976 | Scarnato | |
| 4,040,460 A | 8/1977 | Thornton | |
| 4,474,245 A | 10/1984 | Arney | |
| 4,574,969 A | 3/1986 | Mays | |
| 4,576,237 A | 3/1986 | Arney | |
| 5,201,438 A | 4/1993 | Norwood | |
| 5,472,220 A | 12/1995 | Stephan | |
| D370,388 S | 6/1996 | Cusick | |
| 5,560,429 A | 10/1996 | Needham | |
| 5,669,525 A | 9/1997 | Sapyta | |
| D397,930 S | 9/1998 | Mazda | |
| D397,931 S | 9/1998 | Mazda | |
| 6,378,736 B1 | 4/2002 | Crosslin | |
| 6,612,453 B2 | 9/2003 | Joo-Tai | |
| D481,511 S | 10/2003 | Lee | |
| D493,724 S | 8/2004 | Higuchi | |
| 6,837,502 B1 | 1/2005 | Lee | |
| 6,898,899 B2 | 5/2005 | Weder | |
| D509,439 S | 9/2005 | Higuchi | |
| D510,035 S | 9/2005 | Higuchi | |
| D582,729 S | 12/2008 | Ross | |
| 7,588,087 B2 | 9/2009 | Ashford | |
| 7,654,402 B2 | 2/2010 | Kusuma | |
| 8,006,996 B1 | 8/2011 | Johnston | |
| 8,205,742 B2 | 6/2012 | TerBeek | |
| 8,250,684 B2 * | 8/2012 | Richardson | A47K 3/034 4/571.1 |
| 8,814,199 B2 | 8/2014 | Shindelar | |
| 8,887,942 B2 | 11/2014 | Miksovsky et al. | |
| 2006/0180614 A1 | 8/2006 | Barron | |
| 2006/0273143 A1 | 12/2006 | Finch | |
| 2007/0236922 A1 | 10/2007 | Sheehan | |
| 2007/0237432 A1 | 10/2007 | Mogil | |
| 2008/0099476 A1 | 5/2008 | Fung | |
| 2008/0135550 A1 | 6/2008 | Williams | |
| 2009/0250470 A1 | 10/2009 | Merrick | |
| 2010/0139233 A1 | 6/2010 | Terbeek | |
| 2010/0140279 A1 | 6/2010 | Tyson | |
| 2011/0062618 A1 | 3/2011 | Raymond | |
| 2011/0078930 A1 | 4/2011 | Dunn | |
| 2011/0232926 A1 | 9/2011 | Arney | |
| 2011/0248040 A1 | 10/2011 | McGregor | |
| 2011/0266285 A1 | 11/2011 | Santos | |
| 2012/0279976 A1 | 11/2012 | Desanti | |
| 2013/0032591 A1 | 2/2013 | Moran | |
| 2013/0140211 A1 | 6/2013 | Robbins | |
| 2013/0206430 A1 | 8/2013 | Zheng | |
| 2013/0277364 A1 | 10/2013 | Kusuma | |
| 2014/0166650 A1 | 6/2014 | Kanfer | |
| 2014/0202078 A1 | 7/2014 | Qiu | |
| 2014/0361010 A1 | 12/2014 | Qiu | |

* cited by examiner

BATHING TRAINER

RELATED APPLICATIONS

None

BACKGROUND OF THE INVENTION a. Field of Invention

This invention provides a system for training a Toddler or child for teaching him or her how to bathe. The system preferably includes a bucket for holding the bathing water, a mug that is used to get water from the bucket to rinse the soap off and a protective mat.

b. Description of the Prior Art

Babies are typically bathed in bassinets or similar small tubs typically resting on a table, changing shelf, etc. As they grow bigger, babies outgrow the bassinets, but they are too small to be bathed in a conventional bath tub. Moreover, a conventional bath tub is low to the ground and it is difficult for adults to bathe a small Toddler or child in it, and/or train such a child to wash him or herself. Finally, bathing a Toddler in a standard bath tub is very wasteful and environmentally undesirable since the Toddler requires only a small fraction of the water in a bath tub.

Thus, there is a great need to have a vessel that can be used to wash Toddlers and train them to wash themselves.

SUMMARY OF THE INVENTION

The present invention fulfills this need. Moreover, the device of the invention presents a bathing trainer that is easy and simple to use, can be made kid-friendly, and can be folded and stored away when not in use. The trainer of the invention requires a much smaller amount of water than a tub and therefore it is environment-friendly and can also be used for babies by adding a sling attachment that comes as an accessory with the bucket.

Briefly, the present application pertains to a system for training Toddlers and young children to bathe themselves. The system includes a bucket for holding bath water. The system further includes a mug used to get water from the bucket to rinse the soap off, a mat to protect the floor from water during bathing (and to insure that the Toddler does not slip) and a stool on which the child sits while he or she is bathed.

Preferably, the bucket is collapsible to reduce the amount of space needed to store it while not in use. Several configurations are provided for the collapsible bucket. Preferably, the bucket, when collapsed, forms a storage space for holding the mat, the stool and the mug.

DETAILED DESCRIPTION OF THE INVENTION

As shown in FIGS. 1A-1F, a trainer system 100 constructed in accordance with this invention includes four components: a bucket 12, a stool 14, a mat 16 and a mug 18. It should be understood that while typically buckets are generally cylindrical or frustoconical, the buckets used for the present invention can have other forms as well, as discussed in more detail below. For example, in the embodiment of FIG. 1A, the bucket 12 has a generally rectangular cross-section and narrows in depth from top to bottom.

The bucket 12 is made of a flexible material, such as a plastic, water resistant material. In one embodiment, bucket 12 has a front 12A and a back 12B, both hinged to the bottom 12C so that they can be pivoted towards each other, as shown in FIG. 1B by arrows X1, X2 in order to form a closed configuration having a tent-shaped structure, as shown in FIG. 1C. For this purpose, the front 12A and back 12B are connected to the bottom 12C by hinges 110, 112 or other similar members. The front 12A, back 12B and bottom 12C are stiff planar members so that they do not change their shapes as the bucket is folded into the configuration shown in FIG. 1C.

The bucket 12 further includes two side panels 120, 122. These two panels are made of a flexible material. As the front 12A and back 12B are pivoted together, the two sides 120, 122 fold inward. Preferably, the side panels 120, 122 form a top rim 12G made of a relatively stiff material. A child using the bucket 12 may grab the rim 130 for safety. The rim 12G may be hinged as at 12F so that it allows the rim 12G to fold and extend downwardly with the respective panels 120, 122, as seen shown in FIG. 1C.

12H & 12J are detachable side panels that telescopically slide out of 12A in Y1 and Y2 direction. The purpose for these detachable panels is extending on the left and right side of the bucket to keep toddler away from the faucet.

The tops of the front 12A and back 12B are each provided with a stiff rim 130 with gel padding. The rims 130 have a somewhat circular cross-section, as shown in FIG. 1B.

The stool 14 is preferably made of a light material so that it does not add any considerable weight to the trainer system 100. However, it must be strong enough to support the weight of an average Toddler.

The mat 16 is made of a light material. It can be flexible, or can be relatively stiff. In one embodiment, the mat is made of two panels 16A, 16B connected by a hinge 16C to allow the mat 16 to be stored together with the bucket 12. In one embodiment, one edge of panel 16A is temporarily or permanently attached to a bottom edge of the front 12A. The mat 16 is made of a non-skid material that is easy to clean and disinfect.

The mug 18 can be made so that it is collapsible, as shown at 18A, and can be easily stored in the bucket, as discussed below. For example, the mug 18 may be made of several telescoping sections 18B.

The trainer system 100 is used as follows. When not in use, the bucket 12 is in its closed, tent-like configuration as shown in FIG. 1C. The space within the closed bucket 12 is used to hold the remainder of the trainer components, e.g., the stool 14, the mat 16 and the mug 18. Optionally, instead of being stored in the tent, the mat 16 is attached to the bucket along an edge of panel 16A (see FIG. 1F) and folded against front side 12A.

Figure 1A:
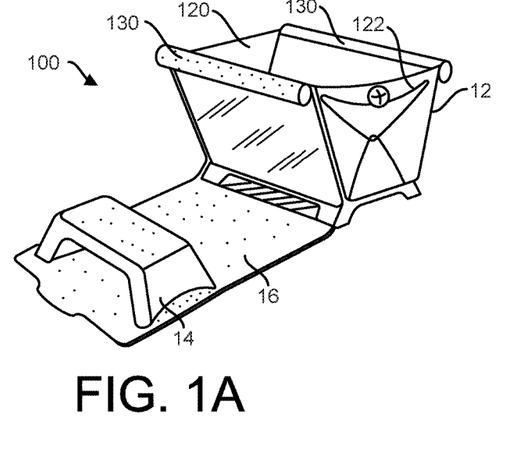
FIGS. 1A-1F show isometric views of a first system constructed in accordance with this invention.
Figures 1B, 1C:
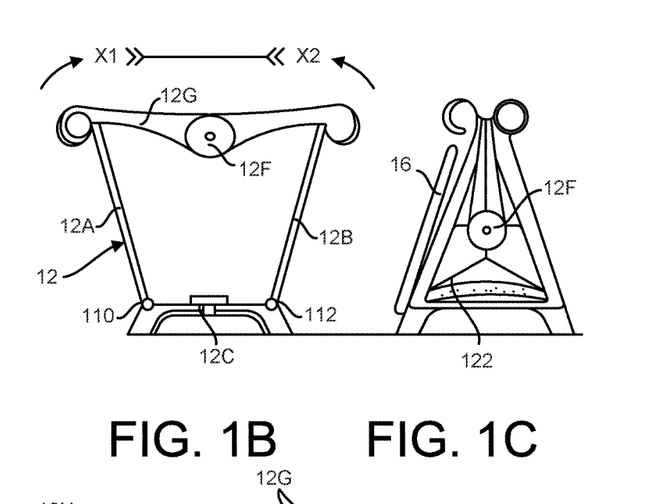
Figure 1D:
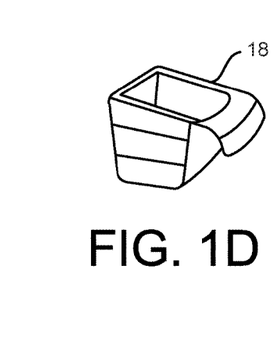
Figures 1E, 1F:
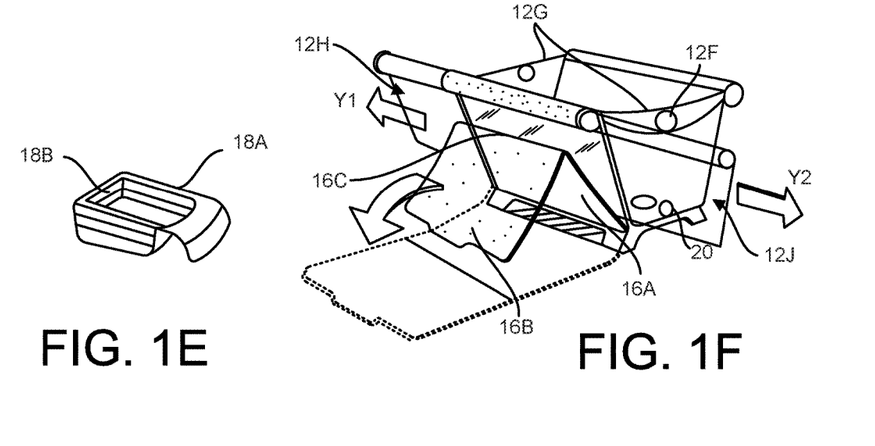

When a Toddler is ready for a bath, the bucket 12 is opened from the closed, tent-like configuration, the mat 16 is removed from the bucket and placed in front of it (as shown in FIG. 1A), or is unfolded from the side of the bucket 12. The stool 14 is removed and placed on the mat 16. The mug 18 is opened and used to get water from the bucket to rinse the soap off. Now the Toddler can sit on stool 14 while he or she is being bathed or, if old enough, he or she can bathe him or herself. When the Toddler is done, the water from the bucket is discarded by opening a plug 20 on the bottom of the bucket 12, the stool 14 and mug 18 are placed in the bucket, and the bucket and mat are folded and then can be stored away.

Preferably, the edges of the bucket 12 are made with a rounded profile, as discussed above, so that a Toddler can hold the bucket easily. The opened bucket and remaining elements of the system may be placed in a bathtub as well. In this case, the bucket 12 is adapted to keep the child away from the bathtub faucet. This feature is further enhanced by the positions of the side panels 12H and 12J while the bucket 12 is open.

In one embodiment, the bucket 12 is formed with plug or valve 20 (FIG. 1F) that can be removed or opened selectively to allow water located inside the bucket to flow out.

FIGS. 2A-2G show another embodiment of the invention. In this embodiment, a trainer system 1200 includes several components: a bucket 1212, a stool 1214, a mat 1216 and a mug 1218. In this embodiment, like in the embodiment of FIGS. 1A-1F, the bucket 1212 has a generally rectangular cross-section and narrows in depth from top to bottom. In other words, when viewing from the side, the bucket 1212 has a generally trapezoidal cross-section.

In one form, bucket 1212 has a front panel 1212A, and a back panel 1212B hinged with horizontal living hinge 1212A-1 and 1212-B2 so that they can be pivoted towards each other, as shown in FIGS. 2 C and 2 D to form a closed configuration having a triangular or tent-shape. The front 1212A, back 1212B and bottom 1212C are stiff planar members so that they do not change their shapes as the bucket is folded into the configuration shown in FIGS. 2C, 2D. Bucket 1212 further includes a liner 1212F sized and shaped to fit between the walls 1212A, 1212B and 1212C, as shown in FIG. 2B. The flexible liner 1212F includes four sidewalls 1212F-1, 1212 F-2, 1212F-3, 1212F-4 and a bottom wall 1212F-5.

Once the flexible liner 1212F slides between walls 1212A and 1212B, the flexible liner 1212F has small pockets 1212F-6 that's slides on to the ribs 1212B-3 on two built in rods 1212-8, 1212-10. The flexible liner 1212F has small snaps underneath that snaps into the holes on 1212C.

Two arms 1212-12, 1212-14 extend between the top edges of sidewalls 1212A, 1212B and are hinged as described below. The arms 1212-12, 1212-14 have cylindrical shaped ends 1212-20, 1212-22 that fit telescopically over rods 1212-8, 1212-10.

Once the liner 1212F and arms 1212-12, 1212-14 are in place, two sleeves 1212-30, 1212-32 made of flexible plastic or gel grip material are snapped over the rods 1212-8, 1212-10.

The bucket 1212 further includes a base 1212G that supports the rest of the elements. In one embodiment, the base 1212G is formed with a set of pins 1212GG disposed under the front wall 1212A of bucket 1212. The mat 1216 is formed with a plurality of holes 1216-A arranged to fit over the pins 1212GG of base 1212G so that the mat 1216 can be attached to the bucket 1212.

The various elements are interconnected by conventional means, such as adhesive, sonic welding, etc. so that they do not separate once the bucket is assembled.

Figure 2A:
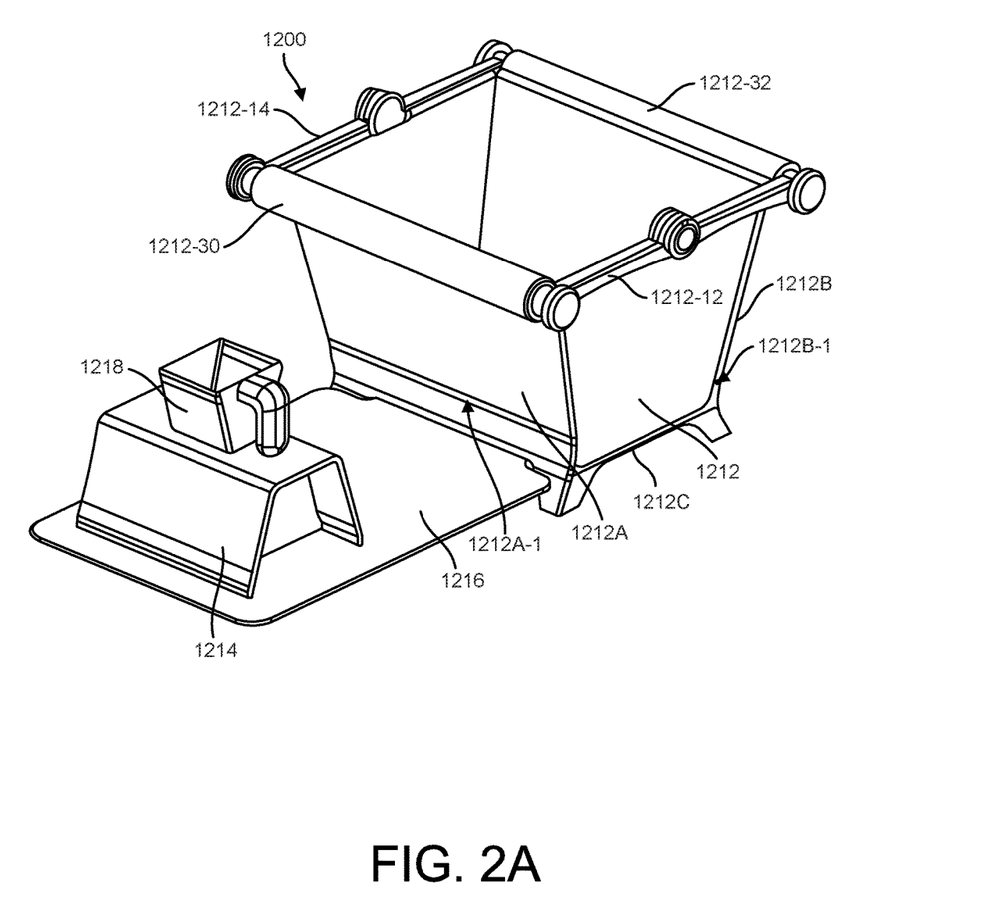
FIG. 2A shows an isometric view of a twelfth system constructed in accordance with this invention, with the bucket in the open position for bathing.
Figure 2B:
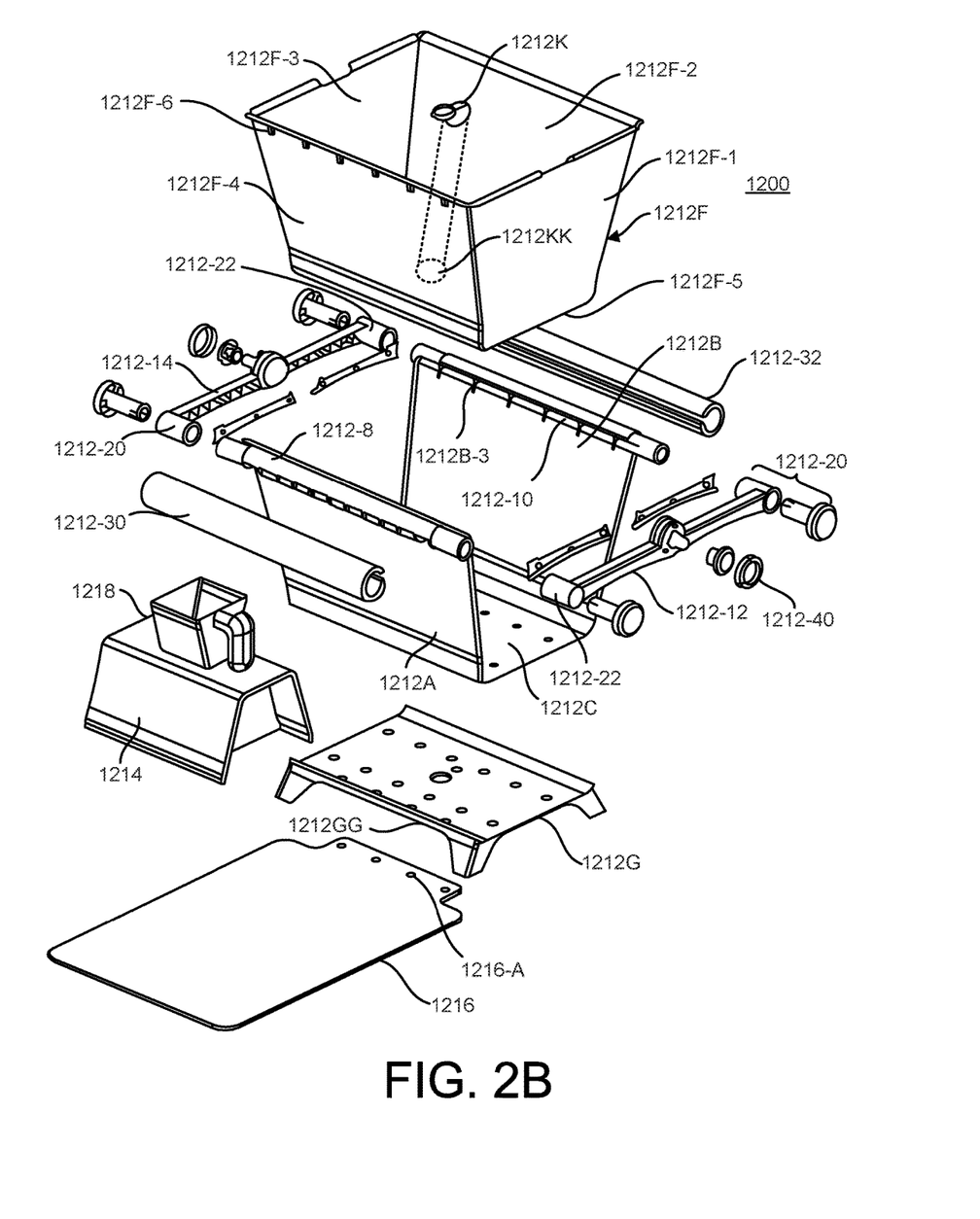
FIG. 2B shows an exploded view of the system of FIG. 2A.
Figure 2C:
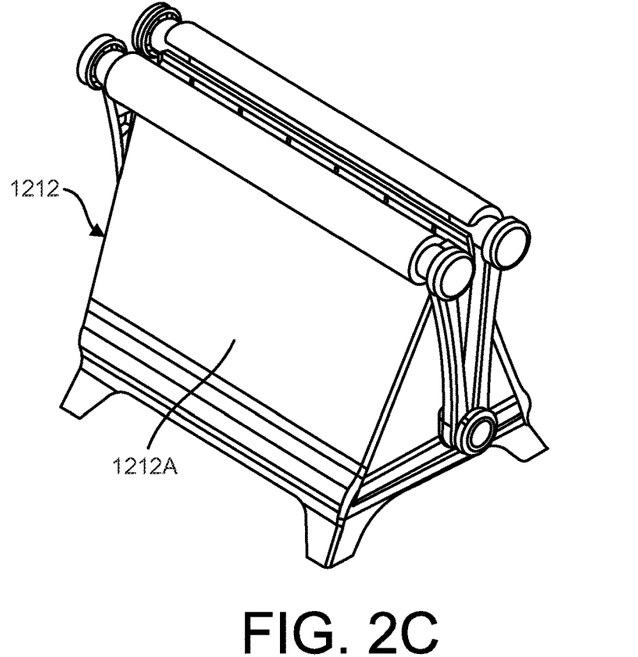
FIG. 2C shows a side/front isometric view of the system of FIG. 2A.
Figure 2D:
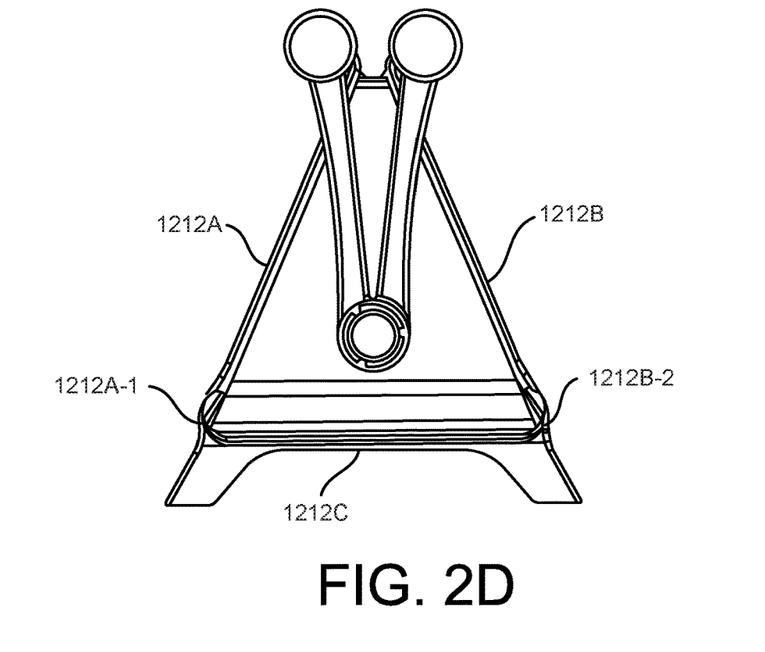
FIG. 2D shows a side elevational view of the system of FIG. 2A.

The bucket 1212 has an open configuration as shown in FIG. 2A. In this configuration, the arms 1212-12, 1212-14 are locked so that they are straight. The two arms are provided with release buttons 1212-40 (described in more detail below). While it is in the open position, the bucket 1212 can be filled with water and used for bathing a Toddler or child.

Once the bath is completed, the bucket 1212 is emptied, for example through a hole 1212KK in the bottom wall 1212F-5, which is selectively covered by a stopper 1212K. Next, the two release buttons 1240 on either sides are pushed inwards, which allows the arms 1212-12 and 1212-14 to pivot into a V-shape. The elements of bucket 1212 are configured so that as the walls 1212A and 1212B are pivoted together, the sidewalls of the liner 1212F1, 1212F3 fold. These sidewalls are made of a flexible material so that they can be folded inwardly. The upper rim of the bucket is defined by the built in rods 1212-8, 1212-10 with sides 1212A and 1212B and arms covers 1212-30, 1212-32. These elements are preferably made of a relatively stiff material to insure that the bucket does not collapse while in use. Moreover, a child using the bucket 1212 may grab the upper rim 1212-30 and 1212-32 for safety.

The stool 1214 is preferably made of a light material so that it does not add any considerable weight to the trainer system 1200. However, it must be strong enough to support the weight of an average Toddler.

The mat 1216 is made of a light material. It can be flexible, or can be relatively stiff. It can temporarily or permanently attach between the base 1212G of bucket 1212 and the rest of the bucket 1212.

Figure 2E:
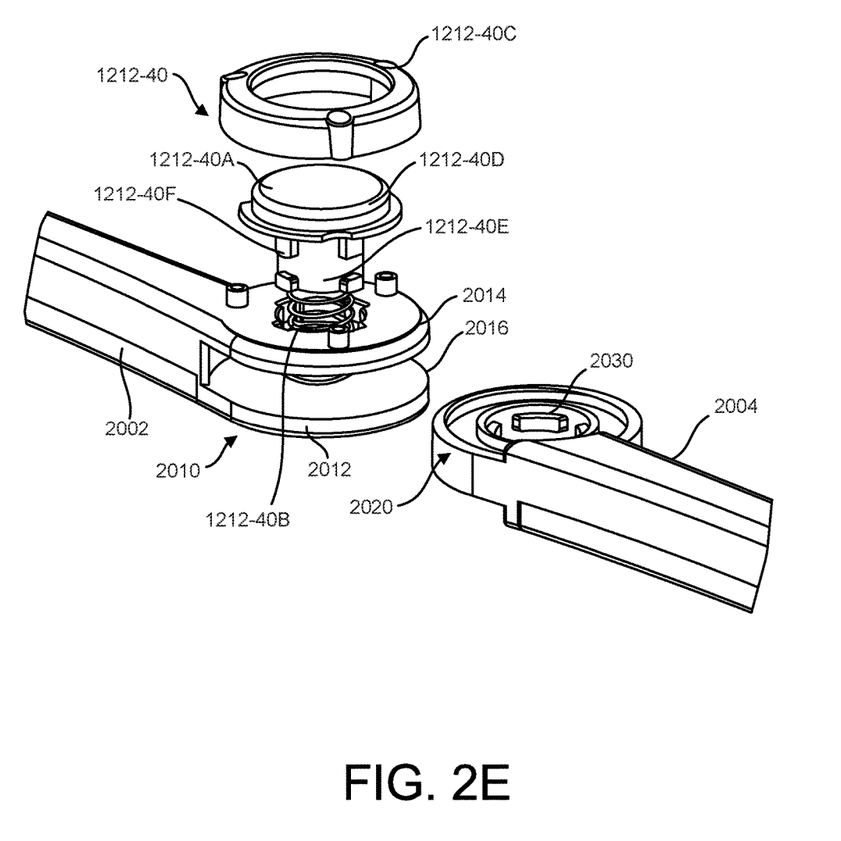
FIG. 2E shows a partial exploded view of an arm used in the system of FIG. 2A.
Figure 2F:
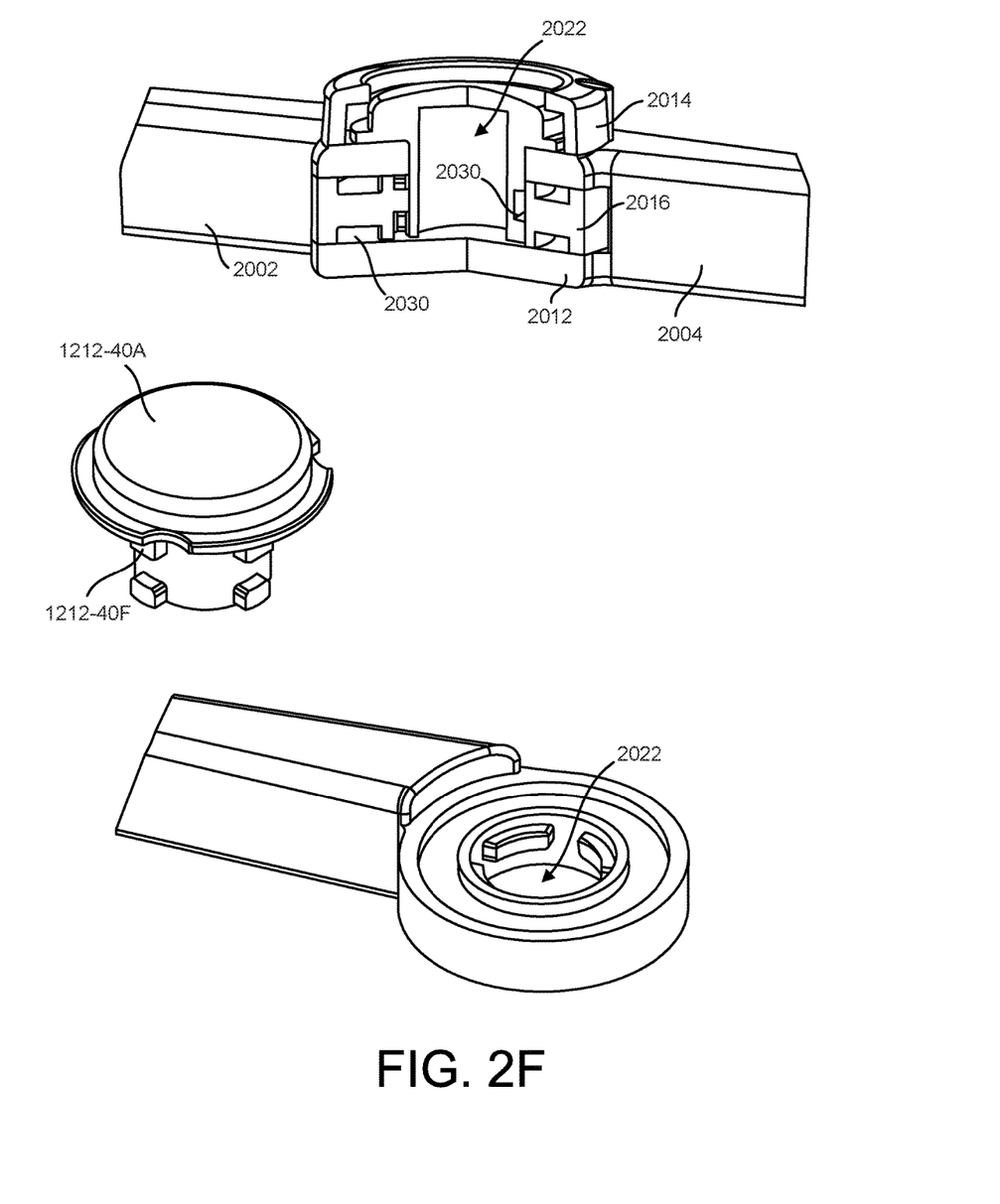
FIG. 2F shows another partial exploded view the arm of FIG. 2E.
Figure 2G:
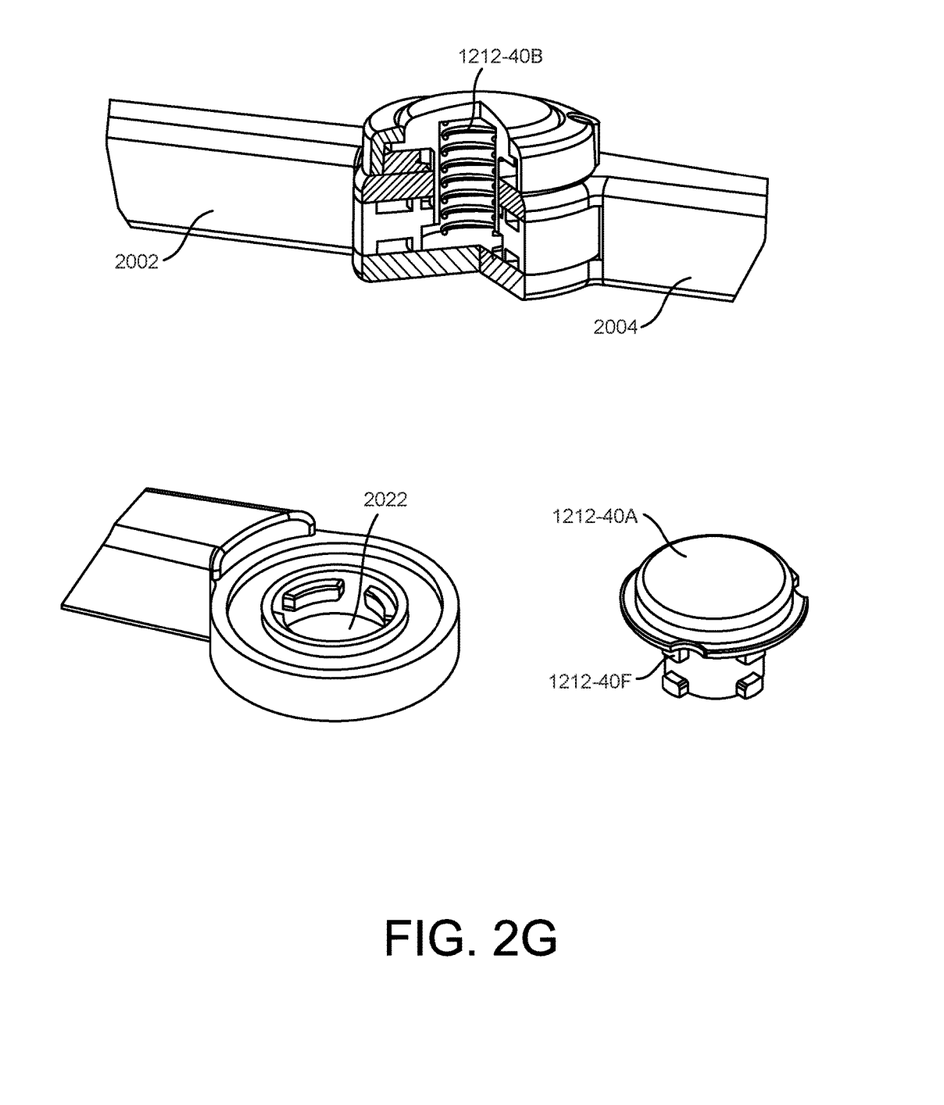
FIG. 2G shows another partial exploded view of the arm of FIG. 2E.

Referring now to FIGS. 2E-2G, the arms 1212-12, 1212-14 are identical and each include a first segment and a second segment 2002, 2004. Segment 2002 includes an end 2010 with two parallel arm sections 2012, 2014 spaced apart by a gap 2016.

Arm segment 2004 has an end 2020 sized and shaped to fit in gap 2016 between the two sections 2012, 2014. End 2020 and sections 2012, 2014 have round apertures formed by respective internal walls, each internal wall being formed with circumferential ribs, as at 2030. When the two segments 2002, 2004 are placed with the end 2016 being interleaved between sections 2012, 2014, a transversal hole 2022 is formed there between.

Button 1212-40 is shown in more detail in FIG. 2E and it includes a button head 1212-40A, spring 1212-40B and a retainer 1212-40C. The button 1212-40 fits in transversal hole 2022. The button 1212-40 also includes a disk 1212-40D and a cylindrical shaft 1212-40E. Shaft 1212-40E is formed with ribs 1212-40F.

The button 1212-40 is installed by inserting the head 1212-40A so that the spring 1212-40B and the shaft 1212-40E extend into the hole 2022 with the ribs 1212-40F fitting between the ribs 2030. The bottom of spring 1212-40B rests against the segment 2012 and the spring 1212-40B is designed to bias the disk 1212-40D outwardly or upwardly (as viewed in FIG. 2E). The retainer 1212-40C is pushed down to force the disk 1212-40D downwardly into hole 2022 and then turned to engage a portion of section 2014. In this matter, the button head 1212-40A is captured inside hole 2022.

The components described above are sized and configured so that when the sections 2012, 2014 are lined up along a common longitudinal axis, the button head 1212-40A is pushed outward by spring 1212-40B in an outermost position. In this position of the button head 1212-40A, the ribs 1212-40F are radially positioned between ribs 2030 of the sections 2012, 2014 and lock the sections into a straight position so that the sections cannot pivot toward each other as shown in FIG. 2A. Pushing the button head 1212-40A inwardly causes the ribs 1212-40F to move axially inwardly into a position selected to allow the ribs 2030 to move angularly as the arm sections 2012, 2014 are pivoted to the closed positioned shown in FIGS. 2C, 2D. The button head 1212-40A is kept in the depressed position by the ribs. Once the arm sections are straightened, the spring 1212-40C pops the head 1212-40A outward.

Importantly, in one embodiment, the two sidewalls 1212F1, 1212F3 are made of a thermochromatic polymer material such as a polypropylene or polystyrene with appropriate additives. These sidewalls change color to indicate the temperature of the water contained in the bucket. In one embodiment, the button 1212-40 and the stopper 1212K are also made of thermochromatic material. This feature insures that the child is not burned.

The system of FIGS. 2A-2G is used as follows. The components shown in FIGS. 2A-2D (or at least the mat 1216 and mug 1218, and potentially other bathing toys) are normally stored in the bucket 1212 in the closed position. Alternatively, the mat 1216 is permanently attached to the bucket and folded over the front wall 1212A. When a caretaker wants to bathe a child, the bucket 1212 is placed in a bathtub close to the faucet, its contents are removed and the mat 1216 is attached at the bottom of the bucket, as shown in FIG. 2A. The bucket is sized so that it fits into a standard bathtub and holds up to 5 gallons of water. (A typical bathtub holds about 70 gallons of water. Thus, if the present system is used as opposed to a bathtub, some 65 gallons of water are saved). The bucket 1212 is filled with water. The water temperature is indicated by the color of the respective thermochromatic elements, e.g. sidewall 1212F1, button 1212-40, stopper 1212K, etc. The child is then placed in the bathtub adjacent to the bucket 1212 on mat 1216 and is allowed to play and bathe. When the child is finished, he/she is removed from the bathtub. The bucket is drained, emptied, rinsed and dried, the remaining system components are placed back into the bucket 1212 and the bucket 1212 is closed.

Numerous modifications have been made to this invention without departing from its scope as defined in the appended claims.

The invention claimed is:

1. A bath trainer comprising:
a bucket having sides forming an interior water-tight space for holding water, said sides being configured to fold to a closed position when the bucket is not in use and unfold to an open position for receiving water; and
a mat configured to be removable and attached to said bucket;
wherein said sides include a front wall and a back wall, said front and back walls being rigid, as well as two opposed side walls extending between said front and back walls, said side walls being flexible to allow said side walls to fold inwardly or outwardly.

2. The bath trainer of claim 1, wherein said bucket further comprises a bottom with a hole and a stopper for covering said hole, said hole being positioned for emptying water from the bucket.

3. The bath trainer of claim 1, further comprising a base for supporting said sides, said mat being attached to said bucket at a juncture between the base and one of said sides.

4. The bath trainer of claim 1, wherein said bucket has a rectangular plan cross-section.

5. The bath trainer of claim 1, wherein said bucket has a trapezoidal vertical shape.

6. The bath trainer of claim 1, wherein said bucket includes a rigid rim with two stiff rods disposed on top of said front and back walls and two opposed arms connected end to end to said rods and being attached to the top of said side walls.

7. The bath trainer of claim 6, wherein said opposed arms have central hinges to allow each arm to pivot.

8. The bath trainer of claim 7, wherein said bucket includes a bottom and said front and back walls are connected to said bottom.

9. The bath trainer of claim 8, further comprising hinges connecting said front and back walls to said bottom.

10. The bath trainer of claim 1 wherein a portion of said bucket is made of a thermochromatic material.

11. A bucket for a bath trainer system, said bucket comprising:
sides and a bottom forming an interior water-tight space for holding water, said sides being configured to fold to a closed position when the bucket is not in use and unfold to an open position for receiving water;
wherein said sides include a front wall and a back wall, said front and back walls being rigid, and two opposed side walls extending between said front and back walls, said side walls being flexible to allow said side walls to fold inwardly or outwardly.

12. The bucket of claim 11, wherein said bottom has a hole and a stopper for covering said hole, said hole being positioned for emptying water from the bucket.

13. The bucket of claim 11, wherein said bucket has a rectangular plan cross section.

14. The bucket of claim 11, wherein said bucket has a trapezoidal vertical shape.

15. The bucket of claim 11, further comprising a rigid rim with two stiff rods disposed on top of said front and back walls and two opposed arms connected end to end to said rods and being attached to the top of said side walls.

16. The bucket of claim 15, wherein said opposed arms have central hinges to allow each arm to pivot.

17. The bucket of claim 11, further comprising hinges connecting said front and back walls to said bottom.

18. The bucket of claim 11, wherein at least one element thereof is made of a thermochromatic material.

* * * * *